March 18, 1969    H. L. FELDKIRCHNER ET AL    3,433,610
STEAM-REFORMING OF HYDROCARBONS FOR PRODUCTION
OF HIGH METHANE CONTENT GAS
Filed June 1, 1965
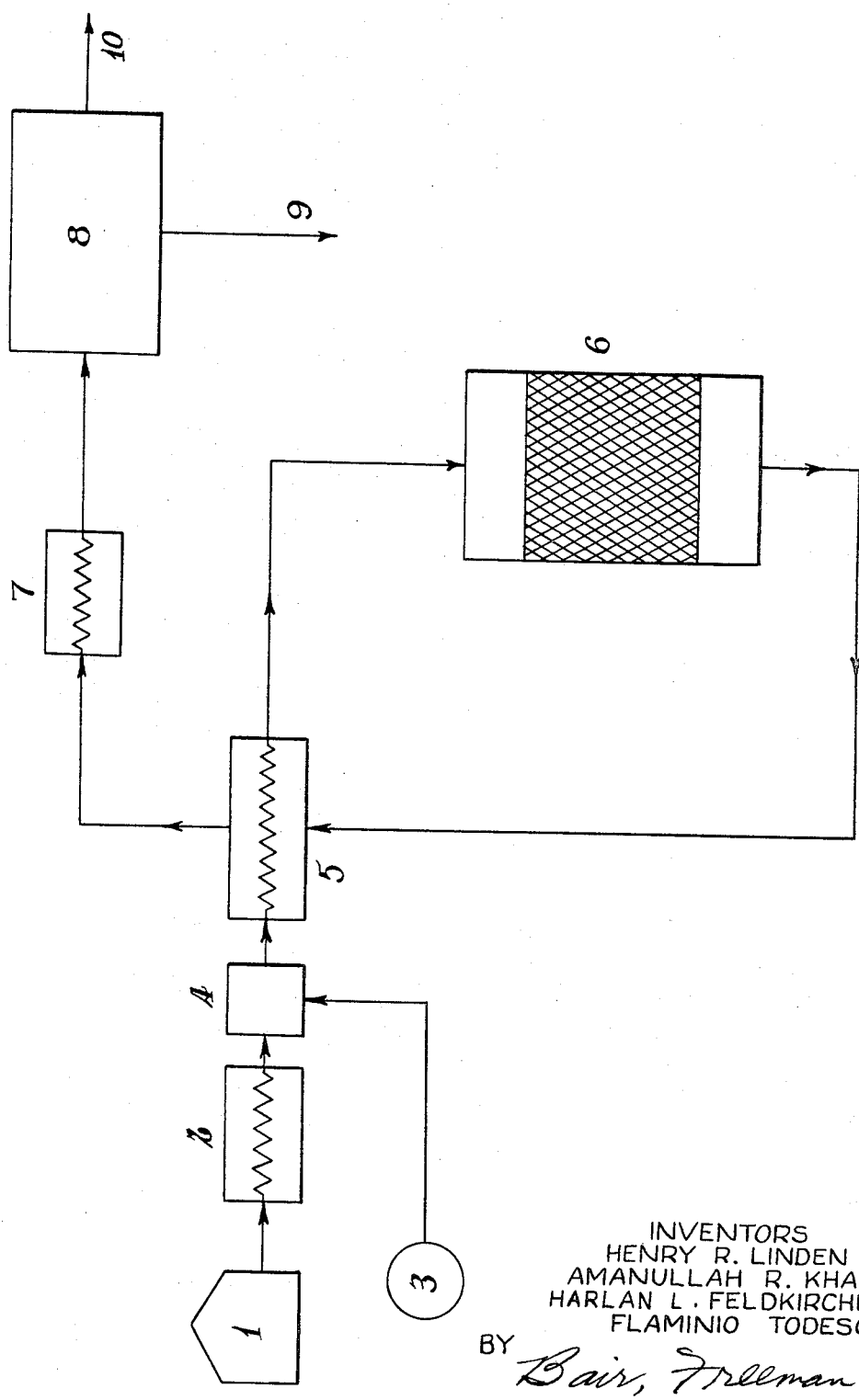
INVENTORS
HENRY R. LINDEN
AMANULLAH R. KHAN
HARLAN L. FELDKIRCHNER
FLAMINIO TODESCA
BY *Bair, Freeman &*
*Molinare* Attys.

United States Patent Office 3,433,610
Patented Mar. 18, 1969

3,433,610
STEAM-REFORMING OF HYDROCARBONS FOR PRODUCTION OF HIGH METHANE CONTENT GAS
Harlan L. Feldkirchner, Chicago, Henry R. Linden, Hinsdale, and Amanullah R. Khan, Chicago, Ill., and Flaminio Todesca, Milan, Italy; said Feldkirchner, Linden, and Kahn assignors to Institute of Gas Technology, a corporation of Illinois
Filed June 1, 1965, Ser. No. 470,658
U.S. Cl. 48—214   7 Claims
Int. Cl. C10g 11/28, 11/02; B01j 11/26

ABSTRACT OF THE DISCLOSURE

A method of steam reforming gaseous hydrocarbons or liquid hydrocarbons or mixtures thereof which can be fed into a reactor in vapor form at operating conditions to produce a high methane content gas useful as a peak shaving pipeline gas partially or completely interchangeable with natural gas. The steam reforming is run in the presence of a nickel-alumina-aluminum catalyst at superatmospheric pressures in the range of between above about 5 to 30 atmospheres and at temperatures ranging from about 650° to 1,050° F. Typical hydrocarbon feed stocks are liquefied petroleum gases, petroleum naphthas, natural gasoline, kerosene and the like. For such feedstocks, the product gas after removal of carbon dioxide and water contains an excess of 70 mole percent methane. The steam-to-hydrocarbon weight ratio of feed material is maximally about 4.5:1, and minimally 2.6:1.

This invention relates to an improved process for converting hydrocarbons by catalytic steam reforming into a high methane containing gas. In particular the invention relates to converting hydrocarbons into a pipeline gas partially or completely interchangeable with natural gas. It is desirable to be able to produce quickly and economically a high methane gas which can be used to meet peak loads during those temporary periods when the output of the natural gas pipeline is insufficient to meet the needs.

One method of making a substitute natural gas is cyclic regenerative thermal cracking of liquid petroleum feedstocks. However, in these processes the feedstock is not completely converted to product gas and the gaseous portion contains a wide spectrum of compounds which are undesirable for peak shaving purposes. Furthermore, the cyclic process itself has the inherent disadvantage of being noncontinuous.

In order to make high methane containing cases it has been proposed heretofore to reform light paraffinic hydrocarbons by steam reforming, for example petroleum distillates, by reacting the preheated vapor of the hydrocarbons with steam at pressures up to 25 atmospheres and temperatures between 662° and 932° F. in the presence of a nickel catalyst to produce a gas containing more than 50 mole percent methane after removal of carbon dioxide and water. In such processes it is necessary to use a feedstock which is substantially sulphur free (less than 2 parts per million by weight) in order to run the reactor for a practical time period. Higher sulphur contents in the paraffinic hydrocarbon will poison the nickel catalyst in a relatively short time. Even with low sulphur feeds these processes operate at relatively low hydrocarbon feed rates, resulting in large, expensive reactors. Also these processes will not permit use of olefinic or aromatic feed hydrocarbons.

It is thus an object of this invention to produce continuously and selectively a high methane content gas without producing undesirable gaseous and liquid products.

It is another object of this invention to produce continuously and selectively a high methane content gas wherein the hydrocarbon feed is completely converted to product gas.

It is still another object of this invention to produce continuously and selectively a high methane content gas at relatively low temperatures at which methane yield is maximized and overall process efficiency is high.

Another object of this invention is to produce continuously and selectively a high methane content gas from liquid hydrocarbon feedstocks containing aromatic, olefinic and cycloolefinic components.

It is yet another object of this invention to produce continuously and selectively a high methane content gas by a process which involves steam reforming of light hydrocarbons and petroleum distillates and utilizes a novel catalyst.

Still another object of this invention is to produce continuously and selectively a high methane content gas by a process utilizing a low steam-to-hydrocarbon weight ratio, but sufficiently high to prevent carbon deposition on the catalyst, thereby maximizing the methane yield and minimizing carbon oxide and hydrogen yields.

Another object of this invention is to produce continuously and selectively a high methane content gas by a process which operates at pressures higher than atmospheric in order to produce a gas of maximum methane content.

Another object of this invention is to produce continuously and selectively a high methane content gas by a process in which hydrocarbon feed rates are high which reduces the necessary reactor volume and equipment costs at no sacrifice in conversion of the feed to methane.

Other objects of the invention will become evident as the invention is more fully described hereinafter.

The objects of our invention are achieved by reacting with steam, gaseous hydrocarbons or liquid hydrocarbons or mixtures thereof which can be fed to the reactor in vapor form at the operating conditions of the reactor in the presence of a nickel-alumina-aluminum catalyst at superatmospheric pressures, preferably 5 to 30 atmospheres, and at temperatures ranging from about 650° to 1050° F. Typical hydrocarbon feedstocks useful in this invention are liquefied petroleum gases, petroleum naphthas, natural gasoline, kerosene and similar petroleum distillates. For these feedstocks, the product gas after removal of carbon dioxide and water contains in excess of 70 mole percent methane. The steam-to-hydrocarbon weight ratio of feed material is maximally about 4.5:1.

The product gas from this improved process may be used for peak shaving purposes without removing $CO_2$. However, it is also contemplated and is an object of this invention that the gas be used for base load purposes in which case some or all CO₂ is removed. When making base load gas, it is preferable to employ hydrocarbons of lower sulphur content.

The degree of removal of carbon dioxide from the product gas is determined by the degree of interchangeability of the gas that is desired. In the examples cited hereinafter, the gas is scrubbed such that the final CO₂ content is 2 mole percent. This does not preclude producing a gas with final CO₂ content which is higher or lower than 2 mole percent and it is contemplated by this invention that such gases be made. If it is desired to blend the product gas from this invention directly with pipeline gas (natural gas) this may be accomplished without removal of CO₂ depending on the individual demands imposed. It will therefore be understood that the examples hereinafter set out are given for purposes of illustration only and are not to be construed as restricting the invention with regard to final CO₂ content of the gas.

When hydrocarbons are catalytically reformed with steam by the process described herein the following reactions closely approach equilibrium:

$$CO + 3H' \rightleftharpoons CH_4 + H_2O \quad (1)$$
$$CO + H_2O \rightleftharpoons CO_2 + H_2 \quad (2)$$

The precise composition of the product gas is determined by the reaction conditions and the composition of the hydrocarbon-steam feed mixture.

In order to achieve the maximum methane yield in the process of this invention, the following principles apply. Operation should be at low temperatures and high pressures and minimum steam-to-hydrocarbon feed weight ratios. Methane yields increase and hydrogen yields decrease with increases in pressure. Methane yields decrease and hydrogen yields increase with increases in temperature. Carbon dioxide yields vary only slightly with temperature and pressure. Carbon monoxide yields increase with decrease in pressure and increase in temperature. In addition, the molecular weight and composition of the feedstock will dictate optimum conditions of temperature and pressure and steam-to-hydrocarbon feed weight ratios. We have found that lower molecular weight paraffinic feedstocks yield higher methane content product gas at any given set of reaction conditions.

In selecting steam-to-hydrocarbon feed weight ratios for this process, we have found the following to be true: As the molecular weight and carbon content of the feed increase more steam is required; as the reaction temperature increases, more steam is required; and as the reaction pressure increases, less steam is required. The minimum steam-to-hydrocarbon weight ratio required to prevent carbon deposition will depend upon the molecular weight and composition of the feedstock for any given set of reactor operating conditions. We have found that it is possible to operate at steam-to-hydrocarbon weight ratios at low as 1.26:1 with a low-molecular weight, high-hydrogen content feed such as propane to produce a high methane content gas with no carbon deposition on the catalyst.

To achieve a close approach to equilibrium within the temperature range of 650° to 1050° F., a highly active catalyst is required. We have found that it is essential in the practice of this invention to use a nickel-alumina-aluminum catalyst containing from 25 to 80 percent by weight nickel, 10 to 60 percent by weight alumina and the balance aluminum.

As a typical example, the catalyst used in this invention is prepared as follows: An alloy composed of approximately 42 weight percent nickel and 58 weight percent aluminum is crushed into particles of ½-inch diameter or less, and treated with twice its weight of a 0.5 N sodium hydroxide solution in water. When this nickel-aluminum alloy is treated with sodium hydroxide solution, a reaction occurs resulting in evolution of hydrogen and formation of nickel aluminate and alumina. Hydrogen is allowed to evolve until the desired conversion of aluminum is obtained, preferably 30 to 85 percent. During this reaction, the temperature of the mixture is maintained at its boiling point by external heating. After the desired conversion is obtained, the reaction is quenched with cold water. The catalyst is then repeatedly washed with tap water equal each time in weight to the weight of the original alloy for a minimum of 15 washings. After this procedure is accomplished, the catalyst is subjected to four equivalent washings with methanol and then stored in methanol for use in the process. Alternatively, the catalyst may be washed and stored in ethanol, dioxane or other suitable media. Typical compositions of the catalyst prepared by the above are as follows:

| | Composition | | |
|---|---|---|---|
| | Wt. percent | Wt. percent | Wt. percent |
| | Catalyst Batch No. | | |
| | 1 | 2 | 3 |
| Aluminum | 18.5 | 20.3 | 22.0 |
| Nickel | 44.3 | 42.4 | 55.4 |
| Al₂O₃·3H₂O | 37.2 | 37.3 | 22.6 |
| | 100.0 | 100.0 | 100.0 |

We have also discovered that the process of the invention will operate satisfactorily with feedstocks containing a relatively high proportion of normal olefins and cyclo-olefins. The process is equally operable using aromatic feedstocks, for example benzene. In prior processes it has always been necessary to maintain the olefin and aromatic content of the feedstock as low as possible.

Further it is well-known that nickel catalysts are susceptible to sulphur poisoning. However, we have found that when using our catalysts in the process described herein, the catalyst activity remains high even after prolonged use with sulphur-containing feedstocks.

Another novel and unexpected result of the present invention is the high rate at which the feedstock can be converted as it passes through the reactor. The following table illustrates typical space-time-yields, heating values and specific gravities of the product gas which can be obtained with various hydrocarbon feedstocks using the catalyst disclosed in this invention.

TYPICAL GAS YIELDS FROM VARIOUS FEEDSTOCKS

| | Propane | Hexane | Naphtha | Kerosene |
|---|---|---|---|---|
| Feedstock Properties: | | | | |
| C/H Ratio | 4.47 | 5.11 | 5.42 | 5.85 |
| ASTM Boiling Range, °F | | 156 | 167–194 | 261–445 |
| Operating Results, Product Gas Space Time Yield, s.c.f./cu. ft. catalyst-hr | 23,800 | 56,700 | 10,200 | 7,600 |
| Scrubbed Product Gas Properties: | | | | |
| Higher Heating Value, B.t.u./s.c.f | 988 | 957 | 883 | 809 |
| Specific Gravity (Air=1.00) | 0.579 | 0.560 | 0.508 | 0.467 |

In peak shaving it is desirable that the process be capable of high space velocities since it is desired to produce as much gas as possible in the shortest time. We have also discovered as a result of using this catalyst that as the catalyst activity begins to decline it is possible to maintain the initial high space velocity by increasing the temperature of the catalyst bed. For example, if the bed has an initial temperature of 750° F. this temperature may be increased up to about 850° F. to compensate for loss in activity of the catalyst without significantly affecting the quality of the gas or the speed at which it is produced.

For purposes of illustration an embodiment of the invention is shown in the accompanying drawing which is a schematic flow diagram of the overall gasification process.

In the drawing illustrating the practice of this invention, the numeral 1 represents a storage vessel wherein feedstock is stored. The aforementioned feedstock is a hydrocarbon as hereinbefore described.

The hydrocarbon feed is pumped through a heat exchanger 2 wherein it is vaporized and then blended with steam from boiler 3 in a mixing nozzle 4. The mixture is maintained at pressure above atmospheric depending on the nature of the feed and desired product gas composition. The stream of intimately mixed hydrocarbon vapors and steam then passes through a heat exchanger 5 wherein the mixture is preheated to initial reaction temperature, said temperature ranging from 650° to 1,050° F. depending on the conditions of operation, nature of feed, and desired product gas composition. The mixture of hydrocarbon vapors and steam then pass into the reactor 6 and through a bed of the catalyst. The gasification reactions occur here and the hydrocarbons are totally gasified. The resulting effluent which is a mixture of methane, hydrogen, carbon monoxide, carbon dioxide, and undecomposed steam exit from the reactor and exchange heat with the incoming feed stream in preheater 5. Additional cooling of the effluent stream is accomplished in heat exchanger 7 where the surplus heat may be utilized for generation of steam or any other form of process heat whatsoever and water is condensed. The cooled gas stream then proceeds to a carbon dioxide removal unit of any conventional design wherein the carbon dioxide stream 9 is separated from the resulting product gas stream 10. As hereinabove stated, it may not be necessary to remove carbon dioxide from the product gas if such gas is to be used for peak shaving purposes. In such event, the gas is ready for use after leaving heat exchanger 7.

In essence, the process equipment described above has been used successfully on a variety of hydrocarbon feedstocks with the purpose of making high methane content gas.

The invention will be further described by means of the following specific examples, it being understood that these examples are given for purposes of illustration only and are not to be taken as in any way restricting the invention beyond the scope of the appended claims.

EXAMPLE I

An apparatus embodying the system shown in FIG. 1 was employed in the gasification of n-hexane. Steam-to-hexane weight ratios were varied from 1.6:1 to 2.8:1 successfully with substantially no carbon deposition in the catalyst and space-time-yields up to 56,700 s.c.f./hr. of product gas per cubic foot of catalyst were achieved with essentially no hexane feedstock breakthrough. Run conditions were as follows:

| | |
|---|---|
| Catalyst volume | 200 cc. |
| Reactor pressure | 375 p.s.i.g. |
| Temperature at center of bed | 842° F. |
| Steam-to-hexane weight ratio | 1.62. |
| Hexane space velocity | 83 lb./hr.-cu. ft. catalyst. |

Product gas composition (water-free):

| Composition | Mole percent |
|---|---|
| $CO_2$ | 20.8 |
| $H_2$ | 2.3 |
| $CH_4$ | 76.9 |
| Total | 100.0 |

Removal of the carbon dioxide down to 2 mole percent of the product gas results in the following properties:

| Composition: | Mole percent |
|---|---|
| $CO_2$ | 2.0 |
| $H_2$ | 2.8 |
| $CH_4$ | 95.2 |
| Total | 100.0 |
| Specific gravity (air=1.00) | 0.560 |
| Higher heating value B.t.u./s.c.f. | 957 |

Conversion of hexane over the catalyst was 100 percent and no deactivation of the catalyst was observed.

EXAMPLE II

An apparatus embodying the system shown in FIG. 1 was employed in the gasification of a light kerosene which had a gravity of 48.8° API and a boiling range of 361° to 445° F. (ASTM). The kerosene contained:

| Composition: | Volume percent |
|---|---|
| Aromatics | 5.3 |
| Olefins | 1.1 |
| Saturates | 93.6 |
| Total | 100.0 |

No carbon deposition on the catalyst or hydrocarbon breakthrough occurred and run conditions were as follows:

| | |
|---|---|
| Catalyst volume | 100 cc. |
| Reactor pressure | 375 p.s.i.g. |
| Temperature at center of bed | 832° F. |
| Steam-to-kerosene weight ratio | 2.03. |
| Kerosene space velocity | 226 lb./hr.-cu. ft. catalyst. |

Product gas composition (water-free):

| | Mole percent |
|---|---|
| $N_2+CO$ | 1.1 |
| $CO_2$ | 23.6 |
| $H_2$ | 18.1 |
| $CH_4$ | 57.2 |
| Total | 100.0 |

Removal of carbon doxide down to 2 mole percent of the product gas results in the following properties:

| Composition: | Mole percent |
|---|---|
| $N_2+CO$ | 1.4 |
| $CO_2$ | 2.0 |
| $H_2$ | 23.2 |
| $CH_4$ | 73.4 |
| Total | 100.0 |
| Specific gravity (air=1.00) | 0.467 |
| Higher heating value B.t.u./s.c.f. | 809 |

EXAMPLE III

An apparatus embodying the system shown in FIG. 1 was employed in the gasification of a mixed paraffinic hydrocarbon feedstock. The said feedstock was essentially a light naphtha. The pertinent properties of the said feedstock were as follows:

| | |
|---|---|
| Specific gravity ° API | 70.3 |
| ASTM distillation range ° F. | 167–194 |

| Composition: | Volume percent |
|---|---|
| Aromatics | 2.0 |
| Olefins | |
| Saturates | 98.0 |
| Total | 100.0 |

No carbon deposition on the catalyst or hydrocarbon breakthrough occurred and run conditions were as follows:

| | |
|---|---|
| Catalyst volume | 25 cc. |
| Reactor pressure | 355 p.s.i.g. |
| Temperature at center of bed | 935° F. |
| Steam-to-naphtha weight ratio | 2.16. |
| Naphtha space velocity | 328 lb./hr.-cu. ft. catalyst. |

Product gas composition (water-free):   Mole percent
- CO ............................................. 0.2
- $CO_2$ ........................................ 21.5
- $H_2$ ......................................... 12.1
- $CH_4$ ........................................ 66.2

Total ............................................ 100.0

Removal of carbon dioxide down to 2 mole percent of the product gas results in the following properties:

Composition:   Mole percent
- CO ............................................. 0.3
- $CO_2$ ........................................ 2.0
- $H_2$ ......................................... 15.1
- $CH_4$ ........................................ 82.6

Total ............................................ 100.0

Specific gravity (air=1.00) ................. 0.508
Higher heating value ............B.t.u./s.c.f.. 883

EXAMPLE IV

An apparatus embodying the system shown in FIG. 1 was employed in the gasification of a saturated aliphatic hydrocarbon feedstock. The said feedstock was a commercially available feed, essentially propane. The composition of the said feedstock was as follows:

Composition:   Mole percent
- Propane ....................................... 94.5
- Propylene ..................................... 2.5
- Ethane ........................................ 1.5
- Isobutane ..................................... 1.0
- Normal butane ................................. 0.5

Total ............................................ 100.0

Catalyst volume .............. 25 cc.
Reactor pressure ............. 355 p.s.i.g.
Temperature at center of bed .. 890° F.
Steam-to-propane weight ratio . 1.26.
Propane space velocity ....... 834 lb./hr.-cu. ft. catalyst.

Product gas composition (water-free):   Mole percent
- CO ............................................. 0.1
- $CO_2$ ........................................ 16.8
- $H_2$ ......................................... 1.9
- $CH_4$ ........................................ 80.1
- $C_2H_6$ ...................................... 0.1
- $C_3H_8$ ...................................... 1.0

Total ............................................ 100.0

Removal of carbon dioxide down to 2 mole percent of the product gas results in the following properties:

Composition:   Mole percent
- CO ............................................. 0.1
- $CO_2$ ........................................ 2.0
- $H_2$ ......................................... 2.2
- $CH_4$ ........................................ 94.4
- $C_2H_6$ ...................................... 0.1
- $C_3H_8$ ...................................... 1.2

Total ............................................ 100.0

Specific gravity (air=1.00) .................. 0.57
Higher heating value ............B.t.u./s.c.f.. 980

EXAMPLE V

An apparatus embodying the system shown in FIG. 1 was employed in the gasification of an aromatic hydrocarbon feedstock, benzene.

Carbon deposition did not occur because of high steam-to-benzene ratio. The typical run conditions were as follows:

Catalyst volume .............. 25 cc.
Reactor pressure ............. 353 p.s.i.g.
Temperature at center of bed .. 905° F.
Steam-to-benzene weight ratio  4.42.
Benzene space velocity ....... 324 lb./hr.-cu. ft. catalyst.

Product gas composition (water-free):   Mole percent
- $N_2$+CO ..................................... 0.9
- $CO_2$ ........................................ 30.7
- $H_2$ ......................................... 31.3
- $CH_4$ ........................................ 36.7
- $C_6H_6$ ...................................... 0.4

Total ............................................ 100.0

Removal of unreacted benzene, and of carbon dioxide down to 2 mole percent of the product gas results in the following properties:

Composition:   Mole percent
- $N_2$+CO ..................................... 1.3
- $CO_2$ ........................................ 2.0
- $H_2$ ......................................... 44.3
- $CH_4$ ........................................ 52.4

Total ............................................ 100.0

Specific gravity (air=1.00) .................. 0.364
High heating value ............B.t.u./s.c.f.. 675

EXAMPLE VI

An apparatus embodying the system shown in FIG. 1 was employed in the gasification of a jet fuel (JP-4).

The pertinent properties of the said feedstock were as follows:

Specific gravity .................° API.. 56.5
ASTM distillation range .........° F.. 194-478
Sulphur .........................percent.. 0.0042

Composition:   Volume percent
- Saturates ..................................... 84.8
- Olefins ....................................... 4.6
- Aromatics ..................................... 10.6

Total ............................................ 100.0

No carbon deposition on the catalyst occurred, and run conditions were as follows:

Catalyst volume .............. 25 cc.
Reactor pressure ............. 350 p.s.i.g.
Maximum bed temperature .. 900° F.
Steam-to-fuel weight ratio ... 2.36.
Fuel space velocity .......... 254 lb./hr.-cu. ft. catalyst.

Product gas composition (water-free):   Mole percent
- CO ............................................. 0.2
- $CO_2$ ........................................ 22.5
- $H_2$ ......................................... 14.5
- $CH_4$ ........................................ 62.6
- $C_6H_{14}$ ................................... 0.2

Total ............................................ 100.0

Removal of carbon dioxide down to 2 mole percent of the product gas results in the following properties:

Composition:   Mole percent
- CO ............................................. 0.3
- $CO_2$ ........................................ 2.0
- $H_2$ ......................................... 18.3
- $CH_4$ ........................................ 79.1
- $C_6H_{14}$ ................................... 0.3

Total ............................................ 100.0

Specific gravity (air=1.00) _____ 0.492
Higher heating value _____B.t.u./s.c.f__ 860

EXAMPLE VII

An apparatus embodying the system shown in FIG. 1 was employed in the gasification of a technical grade n-octane. Typical run conditions were as follows:

Catalyst volume _____ 100 cc.
Reactor pressure _____ 375 p.s.i.g.
Temperature at center of bed _ 717° F.
Steam-to-octane weight ratio _ 1.88.
Octane space velocity _____ 530 lb./hr.-cu. ft. catalyst.

Product gas composition
(water-free): Mole percent
$N_2$+CO _____ 1.2
$CO_2$ _____ 21.3
$H_2$ _____ 12.1
$CH_4$ _____ 65.4

Total _____ 100.0

If the carbon dioxide were removed down to 2 mole percent the product gas would have the following properties:

Composition: Mole percent
$N_2$+CO _____ 1.4
$CO_2$ _____ 2.0
$H_2$ _____ 15.1
$CH_4$ _____ 81.5

Total _____ 100.0

Specific gravity (air=1.00) _____ 0.497
Higher heating value _____B.t.u./s.c.f__ 861

Conversion of octane over the catalyst was 100 percent and no deactivation of the catalyst was observed.

From the above examples it is apparent that the process produces high-methane content gas continuously from a variety of hydrocarbons containing 2 or more carbon atoms or mixtures thereof when reacted with steam in the presence of the above-mentioned catalyst.

We claim:

1. A continuous process for making methane-rich gas from hydrocarbon feedstocks which comprises vaporizing said feedstocks, reacting said vaporized feedstock with steam in the presence of a catalyst consisting essentially of nickel-alumina-aluminum at a pressure of between above about 5 to 30 atmospheres and at a temperature of between 650° and 1050° F. to produce a gas containing essentially methane, carbon dioxide, hydrogen and small amounts of carbon monoxide.

2. A continuous process as in claim 1 which includes the step of removing carbon dioxide from the product gas.

3. The process of claim 1 in which said catalyst contains 25 to 80 weight percent nickel, 10 to 60 weight percent alumina and the balance aluminum.

4. The process of claim 1 in which the proportion of steam to feedstock ranges from maximally 4.5:1 to minimally 1.26:1 by weight.

5. A process as in claim 1 in which said nickel-alumina-aluminum catalyst contains 44-56 weight percent nickel, 22-38 weight percent alumina, and the remainder aluminum.

6. The process of claim 1 in which hydrocarbon feedstock is gaseous hydrocarbon, liquid hydrocarbon or mixtures of gaseous and liquid hydrocarbon which are vaporous at reactor operating conditions.

7. The process of claim 6 in which said hydrocarbon feedstock is selected from a propane-rich feedstock, n-hexane, a jet fuel, light kerosene, benzene, a light naphtha and n-octane.

References Cited

UNITED STATES PATENTS

| | | |
|---|---|---|
| 1,673,032 | 6/1928 | Williams. |
| 1,799,452 | 4/1931 | Beekley. |
| 1,915,473 | 6/1933 | Raney _____ 252—466 |
| 2,482,866 | 9/1949 | Phinney. |
| 3,271,325 | 9/1966 | Davies et al. |

FOREIGN PATENTS 655,007  1/1963  Canada.

MORRIS O. WOLK, *Primary Examiner.*

R. E. SERWIN, *Assistant Examiner.*

U.S. Cl. X.R.

252—466

UNITED STATES PATENT OFFICE
CERTIFICATE OF CORRECTION

Patent No. 3,433,610                                             March 18, 1969

Harlan L. Feldkirchner et al.

It is certified that error appears in the above identified patent and that said Letters Patent are hereby corrected as shown below:

In the heading to the printed specification, lines 7 and 8, "Milan, Italy; said Feldkirchner, Linden, and Kahn" should read -- Milan, Italy, --. Column 1, line 32, "and minimally 2.6:1" should read -- and minimally 1.26:1 --.

Signed and sealed this 7th day of April 1970.

(SEAL)
Attest:

Edward M. Fletcher, Jr.                                 WILLIAM E. SCHUYLER, JR.
Attesting Officer                                                    Commissioner of Patents